(12) United States Patent
Hamamura et al.

(10) Patent No.: US 6,631,771 B2
(45) Date of Patent: Oct. 14, 2003

(54) CONTROLLER AND CONTROL METHOD FOR ORBIT BORING

(75) Inventors: Minoru Hamamura, Shizuoka-ken (JP); Jun Fujita, Shizuoka-ken (JP); Shigeichi Yamamoto, Shizuoka-ken (JP)

(73) Assignee: Toshiba Kikai Kabushiki Kaisha, Tokyo (JP)

(*) Notice: Subject to any disclaimer, the term of this patent is extended or adjusted under 35 U.S.C. 154(b) by 0 days.

(21) Appl. No.: 10/176,064

(22) Filed: Jun. 21, 2002

(65) Prior Publication Data
US 2003/0010531 A1 Jan. 16, 2003

(30) Foreign Application Priority Data
Jun. 22, 2001 (JP) ...................................... P2001-190134

(51) Int. Cl.⁷ ................................................. B23C 9/00
(52) U.S. Cl. ........................ 175/24; 409/191; 409/200; 409/161; 409/173; 279/6; 408/13; 83/772
(58) Field of Search ............................. 175/24; 409/191, 409/199, 200, 211, 161, 173; 279/6; 408/12, 13; 83/772

(56) References Cited

U.S. PATENT DOCUMENTS

| 4,789,278 A | * | 12/1988 | Dexter et al. |
| 5,005,135 A | * | 4/1991 | Morser et al. |
| 5,044,127 A | * | 9/1991 | Ryan |

FOREIGN PATENT DOCUMENTS

JP    8-126938    5/1996

* cited by examiner

*Primary Examiner*—Roger Schoeppel
(74) *Attorney, Agent, or Firm*—Finnegan, Henderson, Farabow, Garrett & Dunner, L.L.P.

(57) ABSTRACT

For an orbit boring to be performed by a tool (10) in an orbital motion along an orbit (A), a permissible range of an acceleration (a) of the orbital motion is provided to meet a criterion of a machining precision of the orbit boring, and the acceleration (a) is controlled to be suppressed within the permissible range.

8 Claims, 7 Drawing Sheets

FIG.7K

CONTROLLER AND CONTROL METHOD FOR ORBIT BORING

BACKGROUND OF THE INVENTION

1. Field of the Invention

The present invention relates in general to a controller and a control method for orbit boring, and in particular, to a controller for and a control method of controlling an acceleration in an orbit boring.

2. Description of the Related Art

There has been developed a turning operation method for NC (Numerical Control) machine tools (Japanese Patent No. 3093935), in which a boring bar (tool) mounted on a spindle is controlled to always be oriented in a radial direction (normal direction) of circular arc, by the synchronization of a circular interpolatory movement of a center of the spindle on a plane perpendicular to the spindle and a rotational movement of the spindle, to execute a boring process.

This turning operation method, called orbit boring from the mode of movement, is advantageous in that the boring of an arbitrary hole size can be performed with a single boring bar.

SUMMARY OF THE INVENTION

Figure 8:
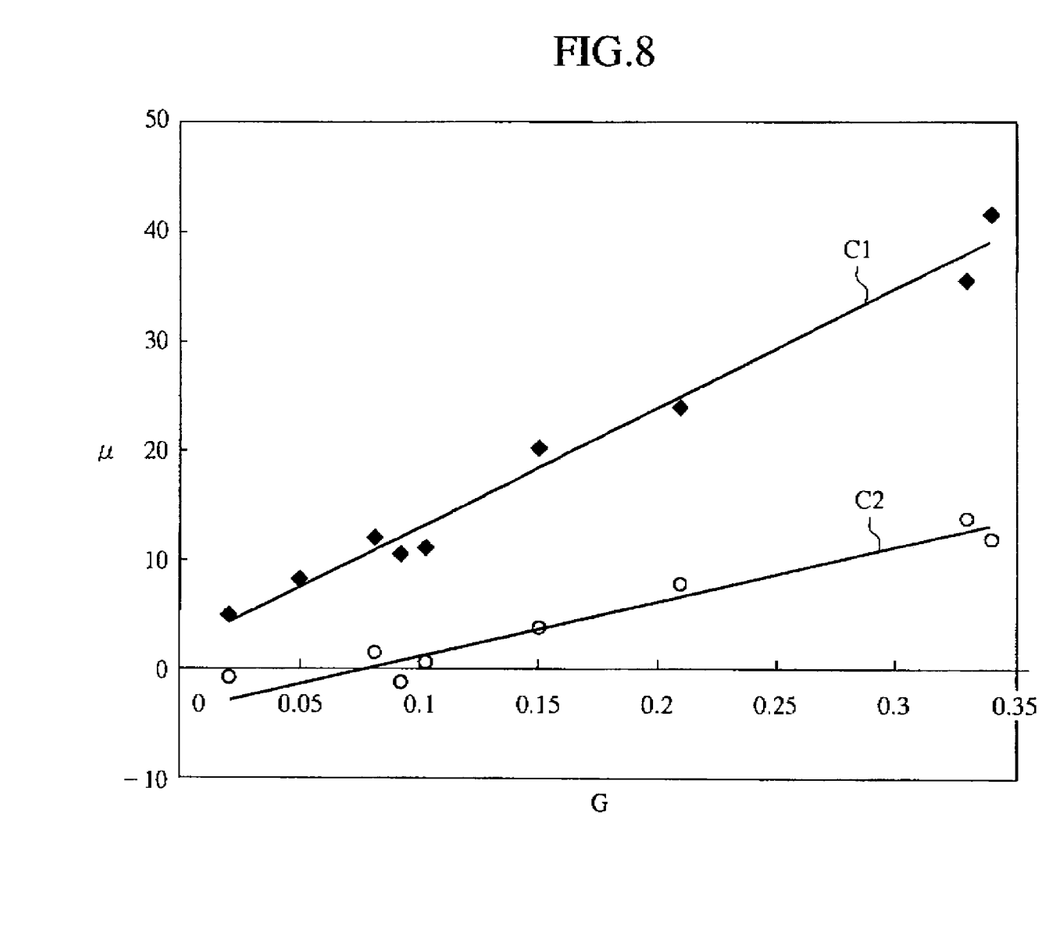
FIG. 8 is a graph of error versus acceleration curves observed by the inventors.

The machining precision (circularity) of orbit boring receives influences such as from an elliptical error or radius reduction error of a spindle or feed members elongated by inertial forces and a pulsatory error due to vibrations of an associated structure in the tooling machine. Such errors increase, as the acceleration increase in the direction of feed. FIG. 8 shows an experimentally observed relationship the circularity (C1 in $\mu$m) or inertial-force derived error (C2 in $\mu$m) has to the acceleration (G). As is apparent, increase in acceleration causes an increased error of circularity (C1) in terms of a radial difference between imaginary circles inscribing and circumscribing a machined circular configuration, This error in circularity is derived from accelerations in orbit boring. It is observed that the machining precision or accuracy (circularity) in the orbit boring is degraded substantially in proportion to an acceleration in the feed direction, with a problem to be experienced in a high-velocity or high-acceleration orbit boring. In actual, the velocity and viscous friction also have their influences. However, the inertial force as well as vibrating force has an increased magnitude in proportion to the second power of the velocity, and occupies the most part of cause of the degradation of circularity, providing the base of a conclusion that the error in circularity be essentially derived from the acceleration.

In cases where the radius of machining by orbit boring changes, such as in a taper machining, the acceleration in the feed direction varies in inverse proportion to the machining radius, so that the machining precision of orbit boring is varied with a varying radius of machining such as in taper machining, with a failure to achieve a conforming circularity.

The present invention has been made with such points in view. It therefore is an object of the invention to provide a controller for and a control method of controlling an acceleration in an orbit boring to suppress or limit a machining error due to the acceleration, so that the machining precision resides within a permissible range or meets requirements therefor.

To achieve the object, an aspect of the invention provides a control method for an orbit boring to be performed by a tool in an orbital motion along an orbit, comprising providing a permissible range of an acceleration of the orbital motion to meet a criterion of a machining precision of the orbit boring, and controlling the acceleration to be suppressed within the permissible range.

Further, to achieve the object, another aspect of the invention provides a controller for an orbit boring to be performed by a tool in an orbital motion along an orbit, comprising a provider for providing a permissible range of an acceleration of the orbital motion to meet a criterion of a machining precision of the orbit boring, and a controller for controlling the acceleration to be suppressed within the permissible range.

BRIEF DESCRIPTION OF THE DRAWINGS

The above and further objects and novel features of the present invention will more fully appear from the following detailed description when the same is read in conjunction with the accompanying drawings, in which:

FIG. 7A to FIG. 7K are diagrams of examples of orbit machining, as the orbit boring or modifications thereof, in the NC machine tool system of FIG. 5.

DETAILED DESCRIPTION OF THE PREFERRED EMBODIMENTS

There will be described below the preferred embodiments of the present invention, with reference to the accompanying drawings, in which like elements or members are designated by like reference characters.

Figure 5:
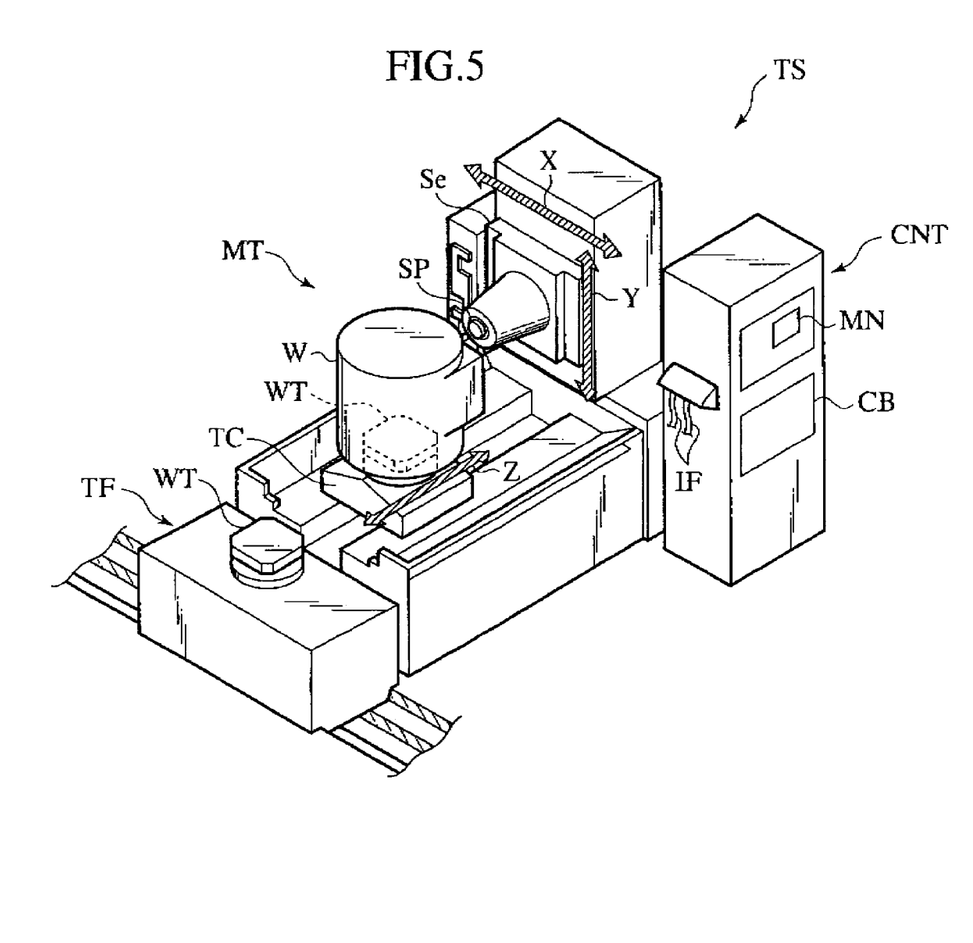
FIG. 5 is a perspective view of an NC machine tool system equipped with the numerical controller of FIG. 3.

FIG. 5 illustrates an NC machine tool system TS equipped with a numerical controller CNT according to an embodiment of the invention. The NC machine tool system TS includes: an NC machine tool MT having an X-Y-Z orthogonal coordinate system fixed thereto; the numerical controller CNT for providing NC control signals as commands to drives, i.e. to a spindle rotating servo motor (25 in FIG. 3), a combination of X-feed and Y-feed servo motors (26, 27 in FIG. 3) for rotating spindle carrier feed screws, and a Z-feed servo motor (28 in FIG. 3) for rotating table feed screw; and a table forwarder TF for forwarding a work table WT with a work W fixed thereon to be set in position to the machine tool MT.

The machine tool MT has a table carrier TC for carrying the table WT with the work W thereon to displace in a machine-longitudinal Z-axis direction, and a spindle carrier SC for carrying a spindle SP held thereto to displace in a machine-transverse X-axis direction and a vertical Y-axis direction. The numerical controller CNT has a touch-panel monitor MN, a control board CB, and data interfaces IF to the machine tool MT and an associated computer network.

The spindle SP is, but may not be, configured to move in the Z-axis direction relative to the spindle carrier SC, with provision of a feed drive and controls therefor. It however is assumed for comprehension that an axial (Z) feed is established simply by a corresponding movement of the work table WT to be achieved by rotating a feed drive therefor, which also is responsible for error in circularity. Therefore, associated discussion on axial components (Vz, α z) addresses the work table WT and the feed drive therefor. It also is noted that the work table WT, now movable in the Z-axis direction, may preferably be configured to move in X-axis and Y-axis directions, as well. Such precautions are given in view of a general (vector) analysis to be made herein.

Figure 6A:
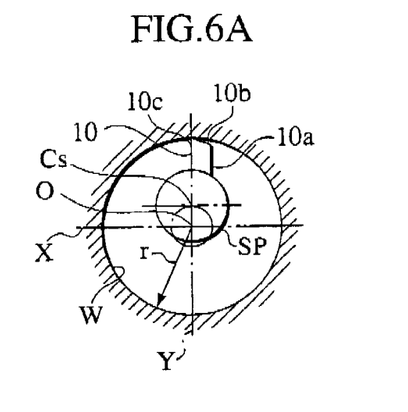
FIG. 6A and FIG. 6B are diagrams illustrating an orbit boring in the NC machine tool system of FIG. 5.
Figure 6B:
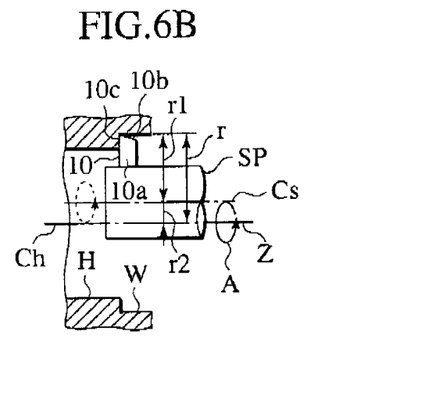

FIG. 6A and FIG. 6B illustrate a cutting tool 10 (as a byte or boring bar) mounted to the spindle SP for an orbit boring to be performed in the NC machine tool system of FIG. 5. FIG. 6A is a cross section, and FIG. 6B is a longitudinal section.

As illustrated in these figures, the tool 10 is fixed at a proximal end 10a thereof to a cylindrical body of the spindle SP, and extends in a projecting manner with a slight inclination to a radial direction of the spindle SP, to have, on a front side at a distal end 10b thereof, a cutting edge 10b located at a predetermined distance r1 (as a tool rotation radius) with respect to an axis Cs or axial center of the spindle SP. As the spindle SP is rotated about the axis Cs, the tool 10 as well as the cutting edge 10c is rotated thereabout in a rotational direction shown by broken lines in the figures.

The work W is formed with a horizontal hole H to be bored, by the tool 10, with a diameter of 2 r, i.e., with a work machining radius r about an axial center Ch of the hole H. The center Ch of the hole H is aligned to be coincident (as shown in FIG. 6B), or in parallel, with a Z axis of the X-Y-Z coordinate system in an imaginary NC control field of the machine tool MT. As shown in FIG. 6A, the X-Y-Z coordinate system has its origin O on the Z axis, where X and Y axes of the coordinate system intersects each other.

As the machining (boring) radius r is greater than the rotation radius r1 of the cutting edge 10c about the spindle axis Cs, this axis Cs is offset (in terms of being controlled to be positioned off) from the Z axis at a distance r2, where it is rotated with an orbit radius (i.e. the offset distance) r2 about the Z axis to describe a "locus (or a set of connected loci) A (forming a circle, ellipse, or spiral in this case)", called "interpolatory orbit (or locus)", or "imaginary orbit (or locus)", or "complementary orbit (or locus)", to be similar to a bored inner circumference of the hole H, as shown by solid lines in the figures. The orbit radius r2 is calculated, such that r2=r−r1 in vector notation. The spindle axis Cs is thus controlled to describe the interpolatory orbit A, by synchronously controlling X and Y feeds (and Z feeds if necessary) of the spindle SP in consideration of a Z feed of the work W on the table WT. As the Z feed as well as the position of imaginary Z axis is variable, loci of the imaginary orbit A may provide a spiral, orbit, or certain spatial curve else than a circle.

Now, terms are defined, with exemplary reference to FIG. 5, and FIG. 6A and FIG. 6B. As used herein, the term:

"work" is a collective name of part (H), now concerned to be cut, of a work (W) set to be machined on a work table (WT) of an NC machine tool (MT), and is defined in NC control (at CNT) by a set of coordinates (X, Y, Z) of the position;

"tool supporting part" is a collective name of part of a spindle (SP) supporting a tool (10) of the NC machine tool (NT), and means in NC control (at CNT) a set of coordinates (X, Y, Z) of the center (Cs) of rotation of the tool (10) about an axis (Cs) of the spindle (SP);

"orbit" means a locus (so-called interpolation locus) (A) as a set of loci of a relative motion of the tool supporting part (on Cs) with respect to the work (W), and is achieved in NC control (at CNT) by calculation and performance of relative movements (X, Y, Z feeds) between the work table (WT) and the tool supporting part (on Cs) (e.g., circular interpolatory movement (A) therebetween), "orbit machining" means an NC machining in which the orbit (A) to be described is intentionally programmed in advance, as a combination of orbit defining expressions and valued parameters therefor and/or data or accesses to obtain data to be processed to determine parametrical values therefor;

"orbit boring" means a boring (FIG. 6A, FIG. 6B) by the orbit machining in which the orbit (A) of the tool supporting part (on Cs) and the angle of rotation of the tool (10) about the axis (Cs) of the spindle (SP) are NC controlled, so that the tool (10) has a constant cutting angle to the work (W); and "contour describing control" means a control for the orbit machining in which the orbit (A) is controlled similar in shape to a contour with which the work (W) is to be machined.

It is noted that the present invention is embodied herein as an implementation of, but not limited to, one of:

(I) a contour describing control method in which:
a bite tool (10) is fixed to a spindle (SP) quantitatively controllable of an angle of rotation about an own center as an axis (Cs) thereof, projecting radially outward of the spindle (SP);
the axis (Cs) of the spindle (SP) is caused to perform relative movements with a locus (A) to a work (W), as the spindle (SP) and the work (W) are relatively displaced by a control of two axes (X, Y) of an X-axis and a Y-axis, at least within an X-Y plane perpendicular to the axis (Cs) of rotation of the spindle (SP), along a machining surface of the work (W), making a mutual interpolatory motion to always keep constant a distance (r1) from the machining surface (H) of the work (W) to be machined to the axis (Cs) of the spindle (SP); and
the angle of rotation of the spindle (SP) is controlled in synchronism with the axes (X, Y) control with a prescribed correlation, always holding constant an angle between a front side at a blade edge (10c) of the bite tool (10) and the machining surface (H) of the work (W) to be machined, achieving a cutting machining of a form with a curved surface depending on an interpolatory locus (A) defined by the mutual interpolatory motion; and (II) a contour describing control method in which:
a bite tool (10) is fixed to a spindle (SP) quantitatively controllable of an angle of rotation about an own center as an axis (Cs) thereof;
the axis (Cs) of the spindle is caused to perform relative movements with a locus (A) to a work (W), as the spindle (SP) and the work (W) are relatively displaced by an axis control of X and Y axes, at least within an X-Y plane perpendicular to the axis (Cs) of rotation of the spindle (SP), along a machining surface (H) of the work (W), making a mutual interpolatory motion to always keep constant a distance (r1) from the machining surface (H) of the work (W) to be machined to the axis (Cs) of the spindle (SP); and the angle of rotation of the spindle (SP) is controlled in synchronism with the (X, Y) axis control with a prescribed correlation, always holding constant an angle between a front side at a blade edge (10c) of the bite tool (10) and the machining surface (H) of the work (W) to be machined, at whole positions of the rotation angle of the spindle (SP), achieving a cutting machining of a form with a curved surface depending on an interpolatory locus (A) defined by the mutual interpolatory motion, wherein the (X, Y) axis control of the relative movements between the spindle (SP) and the work (W) is quantitatively corrected in dependence on a degree of an inclination of the machining surface (H) or a machining axis of the work (W) relative to the center as the axis (Cs) of the spindle (SP), thereby providing the mutual interpolatory motion between the spindle (SP) and the work (W) with a component of the inclination of the machining surface (H) or the machining axis of the work (W) relative to the center as the axis (Cs) of the spindle (SP), for cutting an inclined flange surface or an inner or outer peripheral surface.

FIG. 7A to FIG. 7K are diagrams illustrating various examples of the orbit machining to be performed by a contour describing control method (i.e. with a similar orbit to a machining contour), as the orbit boring or modifications thereof (i.e. having a constant cutting angle to a work), in the NC machine tool system TS of FIG. 5.

Figure 7A:
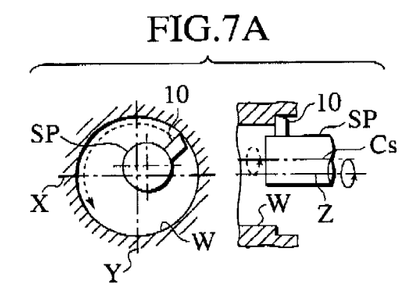
Figure 7B:
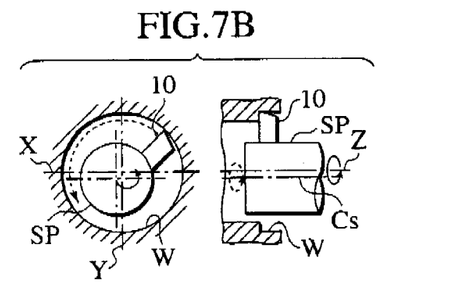
Figure 7C:
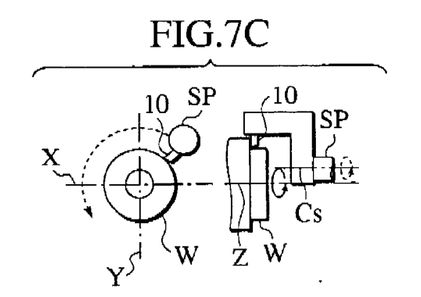
Figure 7D:
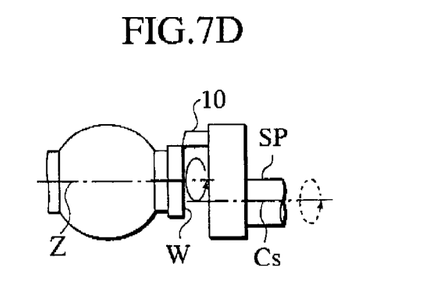
Figure 7E:
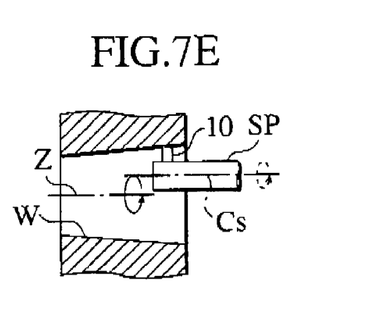
Figure 7F:
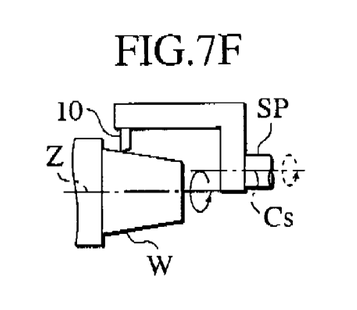
Figure 7G:
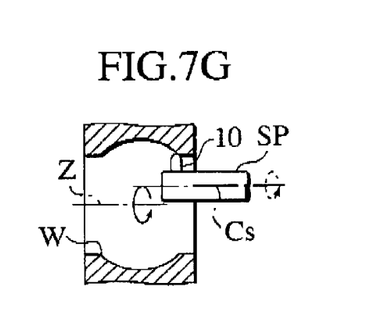
Figure 7H:
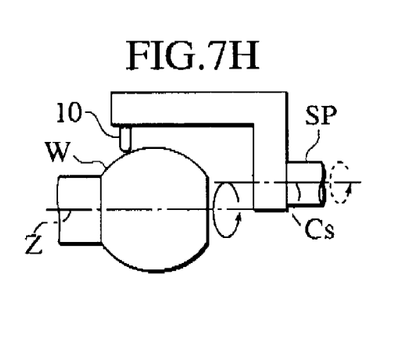
Figure 7I:
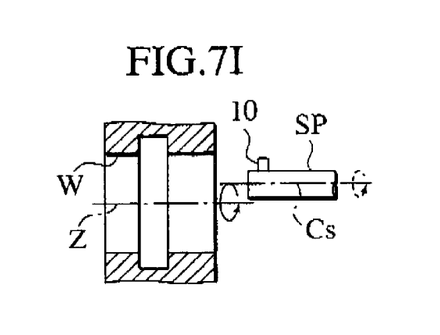
Figure 7J:
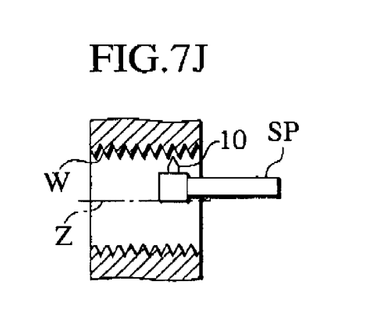
Figure 7K:
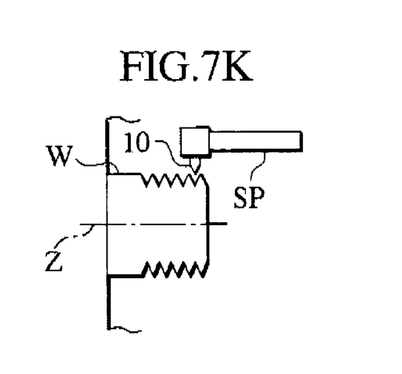

Illustrated in; FIG. 7A is an orbit boring by a bite tool 10 rotated with a spindle axis Cs offset on the same side of a Z axis, as r1<r, for cutting an inner periphery (emphasized by bold lines as in a respective example) of a work W to be bored;

FIG. 7B is an orbit boring by a bite tool 10 rotated with a spindle axis Cs offset on the opposite side of a Z axis, as r1>r, for cutting an inner periphery of a work W to be bored;

FIG. 7C is an orbit machining by a bite tool 10, which radially inwardly extends from a distal end of an elbow jig mounted at a proximal end thereof to a spindle SP, and which is rotated by the spindle SP for cutting an outer periphery of a work W to determine an outside diameter thereof;

FIG. 7D is an orbit machining by a bite tool 10, which axially extends from a distal end of a radially offsetting jig mounted at a proximal end thereof to a spindle SP, and which is rotated by the spindle SP for cutting an end face of a flange of a work W;

FIG. 7E is an orbit machining by a bite tool 10 rotated for cutting a tapered inner periphery of a work W to determine an inside diameter thereof;

FIG. 7F is an orbit machining by a bite tool 10, which radially inwardly extends from a distal end of an axially elongate elbow jig mounted at a proximal end thereof to a spindle SP, and which is rotated by the spindle SP for cutting a tapered outer periphery of a work W to determine an outside diameter thereof;

FIG. 7G is an orbit machining by a bite tool 10 rotated for cutting a spherical inner periphery of a work W to determine an inside diameter thereof;

is FIG. 7H is an orbit machining by a bite tool 10, which radially inwardly extends from a distal end of an axially elongate elbow jig mounted at a proximal end thereof to a spindle SP, and which is rotated by the spindle SP for cutting a spherical outer periphery of a work W to determine an outside diameter thereof;

FIG. 7I is an orbit machining by a bite tool 10 rotated for cutting a circumference of an annular slot of a work W;

FIG. 7J is an orbit machining by a bite tool 10, which radially outwardly extends from a support jig mounted to a spindle SP, and which is rotated by the spindle SP for cutting involutions of inside thread of a work W to determine an inside diameter thereof; and FIG. 7K is an orbit machining by a bite tool 10, which radially inwardly extends from a support jig mounted to a spindle SP, and which is rotated by the spindle SP for cutting involutions of outside thread of a work W to determine an outside diameter thereof.

The present invention is applicable, but not limited, to various examples and modifications of the orbit boring under contour describing control described with reference to FIG. 5 to FIG. 7K.

Figure 1:
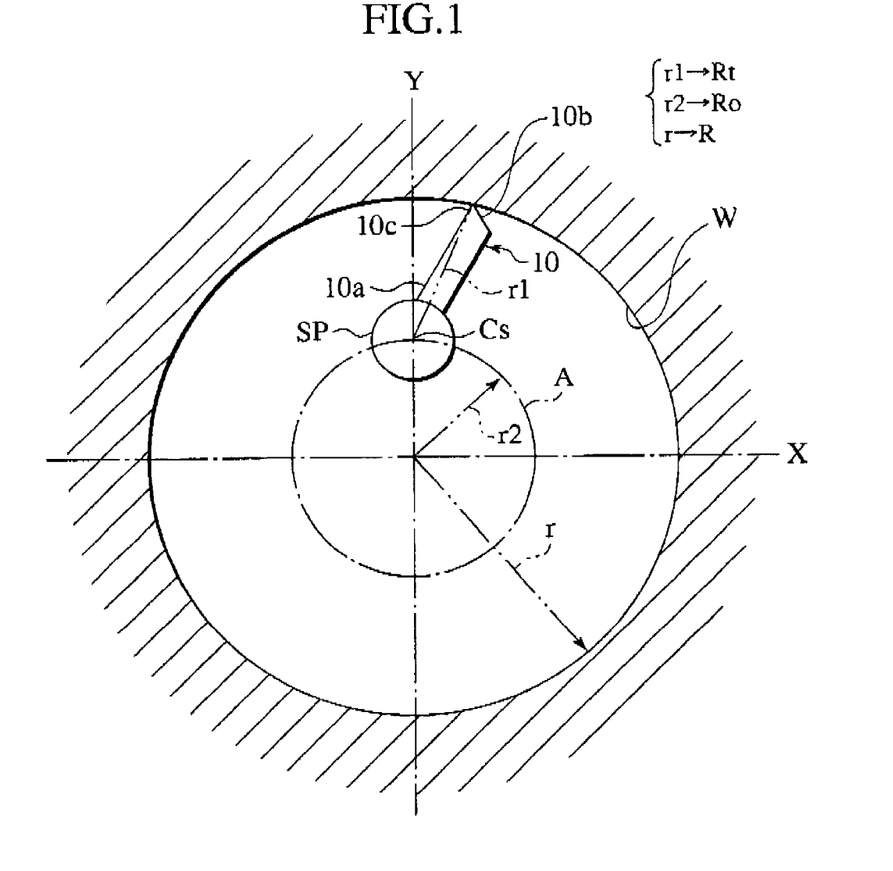
FIG. 1 is a schematic diagram of an orbit boring.
Figure 2:
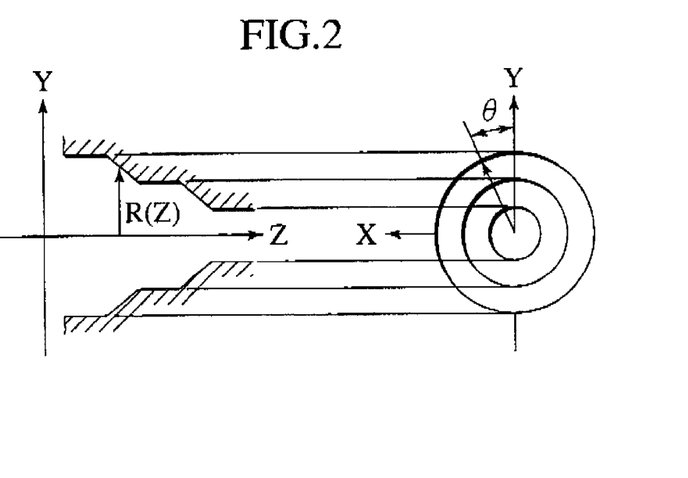
FIG. 2 illustrates an orbit boring having a varied machining radius.
Figure 3:
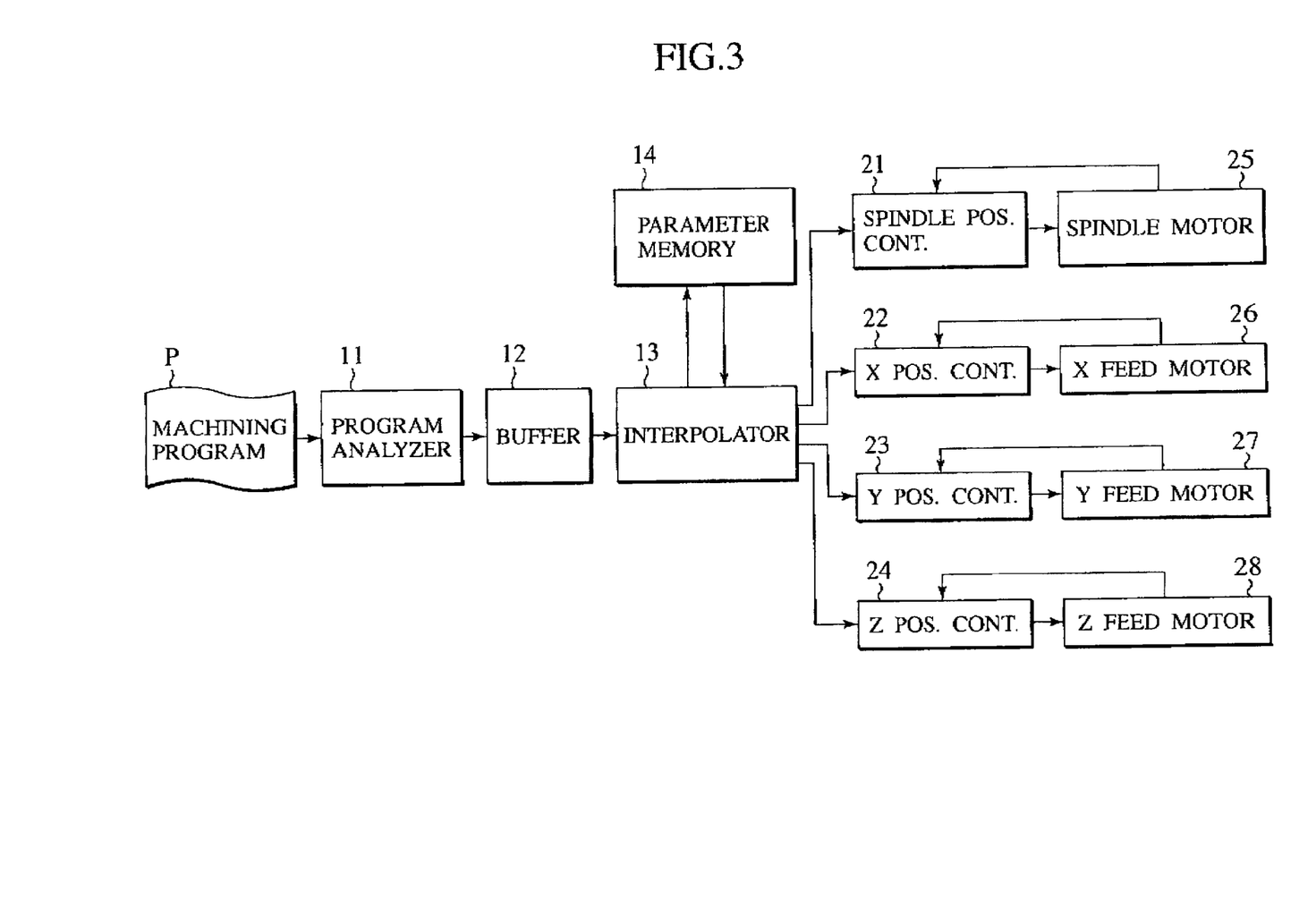
FIG. 3 is a block diagram of a numerical controller according to an embodiment of the invention.
Figure 4:
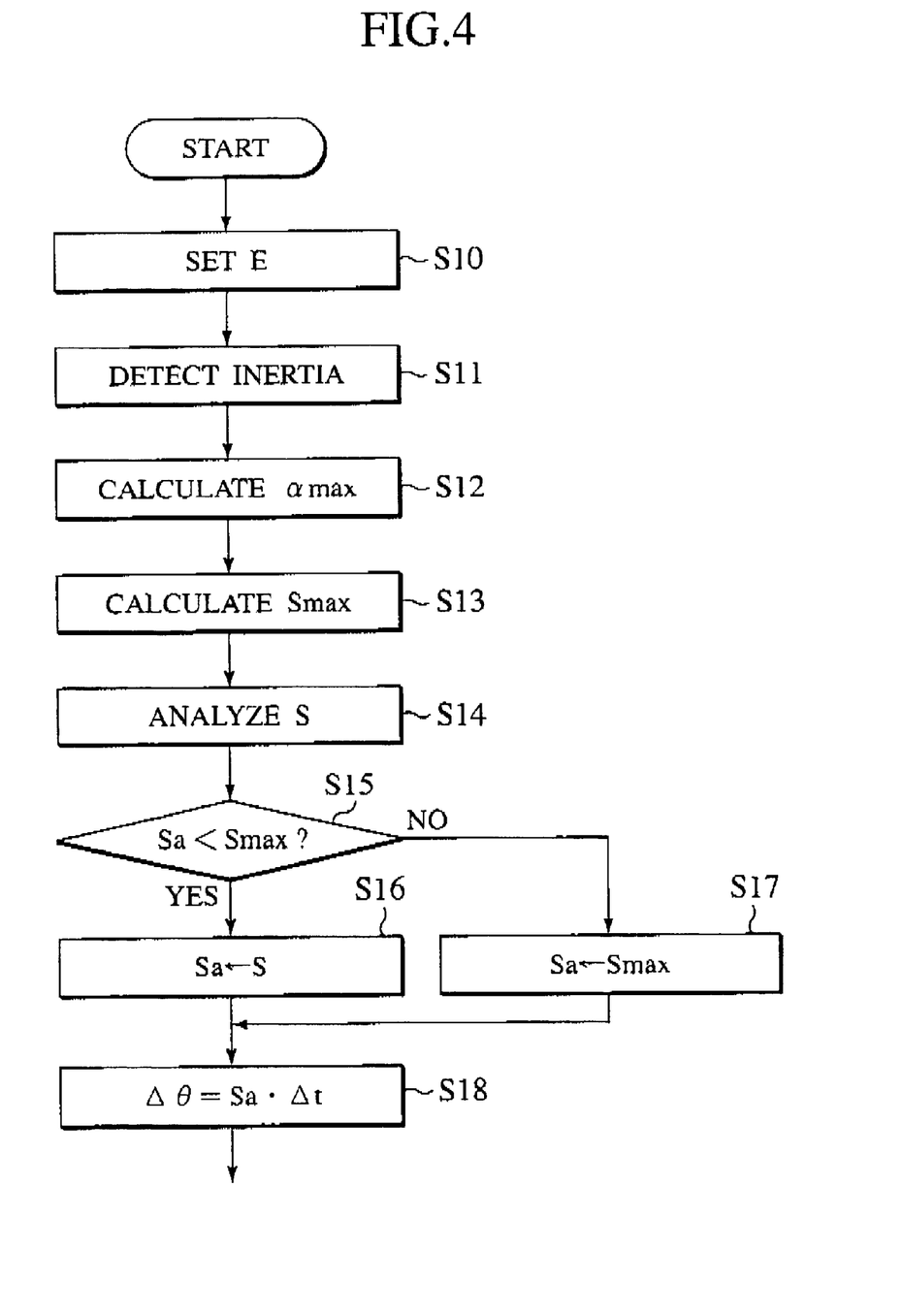
FIG. 4 is a flowchart of actions in an acceleration control of the numerical control of FIG. 3.

However, for the purpose of comprehension, the present embodiment is described, with reference to FIG. 1 (which corresponds to the orbit boring of an inside diameter shown in FIG. 7A), FIG. 2 (which corresponds to a combination of the boring of different inside diameters as an application of FIG. 7A and the boring of a tapered inside shown in FIG. 7E), and associated drawings FIG. 3 and FIG. 4. It is noted that in the following description the tool rotation radius r1, the interpolatory orbit radius r2, and the work machining radius r are represented by capital letters Rt, Ro, and R, respectively, to avoid confusion with other cases.

In the orbit boring, as the spindle SP is rotated at a controlled angle of rotation about the axis Cs and carried by the carrier SC (FIG. 5) undergoing relative X and Y feeds, the spindle axis Cs is controlled by the X and Y feeds to make a circular interpolatory motion relative to the work W (on the table WT), in synchronism with a rotary motion of the spindle SP about the axis Cs, so that the tool 10 is always oriented in a normal direction of the circular interpolatory motion.

Along with the synchronous control, the spindle axis Cs describes a circular interpolatory locus (as the interpolatory orbit) A, having the tool 10 bore the work W with a machining radius of Rt+Ro, where Rt is a tool projection length (as a tool rotation radius) of the tool 10 with respect to the spindle axis Cs, and Ro is an orbit radius to describe the circular interpolatory orbit A.

The projection length (rotation radius) Rt of the tool 10 is invariable, as the tool 10 has a given length unchangeable until a physical replacement of the tool 10. But, the orbit radius Ro is variable in accordance with a programmable command of an associated NC machining program in the numerical controller CNT, (FIG. 5), thus allowing for the single tool 10 to perform a boring of work with an arbitrary machining radius Rt+Ro.

As the spindle SP makes an orbital motion along the interpolatory orbit A relative to the work W, it has a velocity (V) and an acceleration ($\alpha$), which will be discussed.

For simple discussion, the following legends are used herein, when necessary:

V (or V): velocity (vector) at a tool supporting part on the axis Cs of the spindle SP making an orbital motion along the interpolatory orbit A, to be equivalent to a velocity (Vo) of an orbital feed on X-Y plane by the spindle carrier SC, if the axial component (Vz) is insignificant.

Vt: tangential component of V, to be the feed speed for circular orbit

Vtx: X component of Vt.

Vtm: factory-set maximum of Vt.

Vn: normal component of V, to be a radial component if Vz be insignificant, as a cut-in speed at the edge 10c of the tool 10.

Vnx; X component of Vn

Vnm; factory-set maximum of Vn.

Vnp: permissible maximum of Vn, to be set as a maximum cut-in speed.

Vx: X component of V,
 as an X-component sum of Vt and Vn, such that Vx=Vtx+Vnx.

Vxm: factory-set maximum of Vx.

Vz: axial component of V, to inherently be established by a Z feed of the spindle SP, but in this embodiment Vz simply refers to a feed speed of work table WT.

Vm: factory-set maximum of V.

α (or a) :acceleration (vector) at the tool supporting part on the axis Cs of the spindle SP making the orbital motion along the interpolatory orbit A, to be equivalent to an acceleration (αo) of the orbital feed On X-Y plane by the spindle carrier SC, if the axial component (α2) is insignificant.

αt: tangential component of α, to be the feed acceleration for circular orbit.

αtx: X component of αt.

αtm: factory-set maximum of αt.

αn: normal component of α, to be a radial component if αz be insignificant,
 as a cut-in acceleration at the edge 10c of the tool 10.

αnx: X component of αn.

αnm: factory-set maximum of αn.

αnp: permissible maximum of αn, to be set as a maximum cut-in acceleration.

αx: X component of α,
 to be an X-component sum of αt and αn, such that αx=αtx+αnx.

αxm: factory-set maximum of αx.

αz : axial component of α, to inherently be established in a Z feed of the spindle SP, but in this embodiment, αz simply refers to an acceleration of Z feed the work table WT.

αm: factory-set maximum of α.

αo: acceleration of an orbital feed on X-Y plane by the spindle carrier SC.

αox (or αX): X component of αo, as an acceleration of X feed, to be equivalent to ax if αx if αz be insignificant.

αoy (or αY) Y component of αo, as an acceleration of Y feed,
 to be equivalent to αy (Y component of α) if αz be insignificant.

θ: angle that the tool supporting part has about Z axis, relative to Y axis.

γ: angle at an arbitrary position on the orbit A.

Ro: orbit radius, as a radius of curvature of the orbit A, to be constant if the orbit A is a single circle, but variable as the orbit A changes in radius and/or form.

Rt: tool rotation radius, as an invariable radial tool length from the tool supporting part (on Cs) to the cutting edge 10c of tool 10.

R; machining radius, as a vector sum of Rt and Ro, and variable, for example:

for a spiral orbit, such that $$R_n = R_{n-1} + (\Delta R / 360) \Delta \theta,$$

$$X_n = R_n \cos(\theta_{n-1} + \Delta \theta), \text{ and}$$

$$Y_n = R_n \sin(\theta_{n-1} + \Delta \theta),$$

where $R_n$ represents R at an n-th machining rotation,
 $X_n$ represents X at the n-th machining rotation,
 $Y_n$ represents Y at the n-th machining rotation,
 $R_{n-1}$ represents R at an (n−1)-th machining rotation,
 $\theta_{n-1}$ represents θ at the (n−1)-th machining rotation,
 ΔR is a variation of machining radius R per one rotation,
  to be "+" for increment, and "−" for decrement, and
 Δθ is a variation of angle θ, and/or
 where this Δθ may be constant in a typical case; and for an elliptic orbit, such that $$R_n = (D_a/2)\cos \theta_n + (D_b/2)\sin \theta_n,$$

where Da is a long diameter of the elliptic orbit,
 Db is a short diameter of the elliptic orbit, and
 $\theta_n$ , represents θ at the n-th machining rotation, and/or
 where the velocity V may be constant in a typical case.

In general, at the numerical controller CNT, a "representative imaginary point P" of the tool supporting part on the axis Cs of the spindle SP is defined by a position vector p bound to the origin O of X-Y-Z coordinate system, such that $$p = \overrightarrow{OP} = \overrightarrow{p}(X, Y, Z) = Xi + Yj + Zk,$$

where i, j, and k are unit vectors extending along X, Y, and Z axes, and a travel distance s of the tool supporting part P along the interpolatory orbit A is calculated by integrating an increment ds (per time slot) of the travel distance s, such that $$s = \int_A ds$$
$$= \int_{i=u}^{T=T} \sqrt{dX^2 + dY^2 + dZ^2}\, dT,$$

where dX, dY, and dZ are increments (per time slot) of X, Y, and Z feeds, and dT represents an interval of each programmed division slot of the time T.

The numerical controller CNT is thus adapted to analyze characteristics of a spatial curve to be described as the interpolatory orbit A, and determine characteristic parameters of the orbit A, as necessary, including:

a tangential (unit) vector t to be calculated at the point P, such that $$t = dp/ds = (dX/ds)i + (dY/ds)j + (dZ/ds)k;$$

a curvature κ to be calculated at the point P, such that $$\kappa = |dt/ds|$$
$$= |d^2 p/ds^2|$$
$$= \sqrt{(d^2 X/ds^2)^2 + (d^2 Y/ds^2)^2 + (d^2 Z/ds^2)^2}\ ;$$

a radius of curvature ρ to be calculated at the point P, such that $$\rho = 1/\kappa;$$

a (principal) normal (unit) vector n to be calculated (as a unit vector perpendicular to the tangential vector t in an osculating plane) at the point P, such that $$n = \rho(dt/ds)$$
$$= (1/\kappa)(dt/ds)$$
$$= (1/\kappa)(d^2p/ds^2)$$
$$= \left(\frac{1}{\kappa}\frac{d^2X}{ds^2}\right)i + \left(\frac{1}{\kappa}\frac{d^2Y}{ds^2}\right)j + \left(\frac{1}{\kappa}\frac{d^2Z}{ds^2}\right)k;$$

a binormal (unit) vector b to be calculated (as a unit vector perpendicular to the normal vector a in a normal plane) at the point P, such that $$b = (t \times n)$$
$$= (dp/ds \times (1/\kappa)(d^2p/ds^2))$$
$$= (1/\kappa)(dp/ds \times d^2p/ds^2)$$
$$= \left\{\frac{1}{\kappa}\left(\frac{dY}{ds}\frac{d^2Z}{ds^2} - \frac{dZ}{ds}\frac{d^2Y}{ds^2}\right)\right\}i +$$
$$\left\{\frac{1}{\kappa}\left(\frac{dZ}{ds}\frac{d^2X}{ds^2} - \frac{dX}{ds}\frac{d^2Z}{ds^2}\right)\right\}j +$$
$$\left\{\frac{1}{\kappa}\left(\frac{dX}{ds}\frac{d^2Y}{ds^2} - \frac{dY}{ds}\frac{d^2X}{ds^2}\right)\right\}k,$$

where ($t \times n$) represents an operator of outer product between vectors t and n; and
a torsion $\tau$ such that $$\tau = |db/ds|$$
$$= \frac{1}{\kappa^2}\begin{vmatrix} \frac{dX}{ds} & \frac{dY}{ds} & \frac{dZ}{ds} \\ \frac{d^2X}{ds^2} & \frac{d^2Y}{ds^2} & \frac{d^2Z}{ds^2} \\ \frac{d^3X}{ds^3} & \frac{d^3Y}{ds^3} & \frac{d^3Z}{ds^3} \end{vmatrix}.$$

It will be seen that $$db/ds = -\tau n.$$
$$dt/ds = \kappa n, \text{ and}$$
$$dn/ds = -\kappa t + \tau b.$$

Further, the orbital motion of the tool supporting part P is generally defined by;
a velocity vector V such that $$V = Vt,$$

where V (scalar)=ds/dT; and
an acceleration vector a such that $$a = (dV/dT)t + \kappa V^2 n,$$

which has
a tangential component $\alpha t$ such that $$\alpha t = dV/dT, \text{ and}$$

a normal component $\alpha n$ such that $$\alpha n = \kappa V^2 = V^2/\rho.$$

It is noted that both the velocity vector V and the acceleration vector a can be predicted by calculations based on programmed coordinate values and parametric values, and achieved through operations to associated data.

Thus predicted velocity vector V and acceleration vector a of an orbital motion of the tool supporting part P at an associated block of the orbit A are each respectively compared, in magnitude thereof (|V| or |a|) or in magnitude of any component thereof (such as Vt or Vn, or $\alpha t$ or $\alpha n$) whichever is preferable in consideration of practice on the site, with a permissible range (such as under Vnp or $\alpha np$) that is predetermined or real-time calculated therefor on the basis of factory-set (or originally specified) maximum data (such as Vnm or $\alpha nm$) and/or associated operational and program block data and parameters, to check for excessive magnitudes to be corrected (slowed or decelerated at, for example, 13 of FIG. 3) to reside within the permissible range, by changing an NC interpolation command to be transmitted to a position controller (for example, 21, 22, 23, 24 of FIG. 3) of a respective associated axis (for example, spindle and X, Y, Z axes) to be controlled, while the present embodiment is addressed simply to controlling the acceleration.

It is noted that, as a variety of conditions and/or requirements are considered, a resultant permissible range may be defined by a polygonal or polyhedron configuration such as in a linear programming system.

It also is noted that, as the tool 10 is fixed to the tool supporting part P, the orbital motion of this part P is considered representative of an orbital motion of the tool 10. If the projection length of tool 10 is significant, a motion of the cutting edge 10c associated with the orbital motion may be likewise checked and corrected, as that motion of the edge 10c is predictable from expressions described.

In the example of FIG. 2 including a taper machining, the machining radius R is variable as R(Z), such that R(Z)=Ro(Z)+Rt, where the orbit radius Ro is defined as a variable Ro(Z) that varies with an axial (Z) feed of the table WT, while the tool rotating radius Rt is a constant.

FIG. 3 shows a functional block diagram of the numerical controller CNT, which is configured with a program analyzer 11 for reading in advance (pre-reading) associated control blocks of an input machining program PR to analyze them, to thereby provide a set of interpolatory data per block, a buffer 12 for temporarily storing the set of interpolatory data obtained from the pre-read program PR, an interpolator 13 responsible for the set of interpolatory data given from the buffer 12 to perform thereon an interpolatory calculation to determine respective amounts of X, Y, and Z feeds and feed speeds, as well as a rotation of the spindle SP, and a parameter memory 14 for storing necessary parameters for the interpolatory calculation. It will be seen that the numerical controller CNT comprises a computer in which the program analyzer 11 and the interpolator 13 are implemented by execution of the machining program PR.

In the machine tool system TS that performs an orbit boring by controlling associated axes (with SP inclusive), the interpolator 13 is adapted for performing calculations to generate positional commands of the spindle SP and X, Y, and Z axes.

The positional commands are output as control data from the interpolator 13 to respective position controllers 21, 22, 23, and 24 of the spindle SP, X axis, Y axis, and Z axis, where they are converted into electrical control signals to be output as velocity commands to a spindle servo motor 25, a X feed servo motor 26, a Y feed servo motor 27, and a Z feed servo motor 28, which are thereby controlled to operate associated drives.

For the orbital motion of the spindle SP, X feed and Y feed are commanded by position commands, such that:

$X=Ro(Z)\cos \omega t$, and $Y=Ro(Z)\sin \omega t$, where $\omega$ is an angular velocity, and t is a time.

As the orbit boring in a minute time slot is a machining by combination of a circular interpolation and a rotation of the spindle SP, letting Vt be a feed velocity therefor, the acceleration a has such a relationship thereto that:

$\alpha = Vt^2/Ro(Z)$.

The acceleration $\alpha$ is thus varied, when the orbit radius Ro(Z) is changed in the taper machining or such.

In such a machining, therefore, the orbit radius Ro is read or calculated from the pre-read program PR, and an associated acceleration is controlled by controlling an associated velocity (feed speed) to be changed in proportion to a square of the orbit radius Ro(Z), so that the machining precision (circularity) is maintained.

It is noted that if the machining radius R is defined in the machining program PR, the orbit radius Ro(Z) is determined such that Ro(Z)=R−Rt, as the tool rotating radius Rt is known.

In a general case, the acceleration in feed for machining is kept constant by changing the feed velocity in proportion to a square of the radius $\rho$ of curvature of the interpolatory orbit (the orbit radius Ro(Z) in the above-noted case), so that the machining precision (circulartity) is maintained irrespective of variations of the orbit radius.

The machine tool MT has as a proper characteristic thereof a relationship (eg. FIG. 8) between the acceleration in feed direction and the machining precision of orbit boring, of which data may be obtained by measurement in advance and stored in the parameter memory 14, which way be accessed to determine a permissible maximum acceleration in feed direction meeting a criterion for the machining precision of orbit boring, so that the feed velocity as well as the speed of rotation of the spindle SP can be controlled in dependence on the orbit radius, to keep the acceleration in feed direction from exceeding the permissible maximum acceleration.

The relationship that the machine tool MT has as a proper characteristic thereof between the acceleration in feed direction and the machining precision of orbit boring can be obtained by using an external measurement device, such as a DBB (double ball bar) measurer, or accessing inside the numerical controller CNT to know a scale feedback or the like, to thereby actually measure the circularity at a respective acceleration.

More specifically, in the analysis of pre-read machining program PR, a command for the orbit boring is detected to know the orbit radius Ro(Z) and an orbit revolution number S(Z) as functions of the feed Z, which are sent together with a velocity Vz of the Z feed to the interpolator 13, where they are processed together with a sampling period $\Delta t$ to calculate a Z feed per each sampling period, whereby the Z position is updated, such that;

$\Delta Z = Vz \Delta t$, and $Z=Z+\Delta Z$.

whereby the orbit radius Ro (Z) of a current time is determined.

On the other hand, from among data on the relationship between acceleration in feed direction and machining precision of orbit boring, stored in the parameter memory 14, a maximum acceleration (upper limit) $\alpha m$ meeting a parametrically set criterion of machining precision is read, whereby a maximum orbit revolution number Sm can be determined from the orbit radius Ro(Z) and the maximum acceleration $\alpha m$, such that:

$Sm=\sqrt{\alpha m/Ro(Z)}$.

Then, if the orbit revolution number S(Z) in command is greater than the maximum orbit revolution number Sm, an orbit revolution number Sa for actual command is limited to the latter Sm. In case the former S(Z) is smaller than the latter Sm, the former S(Z) is employed as the orbit revolution number Sa for actual command.

The orbit revolution number Sa thus determined for actual command is processed to generate a spindle position command $\theta^*$, a X position command $X^*$, and a Y position command $Y^*$, such that:

$\Delta\theta = Sa \Delta t$, $\theta^* = \theta o + \Delta\theta$.

$X^* = Ro(Z)\cos \theta^*$, and $Y^* = Ro(Z)\sin\theta^*$, whereby the feed velocity as well as the spindle rotation speed is controlled in accordance with the machining radius, so that the acceleration in respective feed direction is prevented from exceeding the maximum acceleration $\alpha m$, resulting in a met orbit boring to the machining precision criterion.

For a respective feed not to exceed the maximum $\alpha m$ in acceleration, the feed velocity as well as the spindle rotation speed may preferably be clamped.

Further, as the relationship between the acceleration in feed direction and the maximum acceleration $\alpha m$ is influenced by the weight of work W set on the work table WT of the machine tool M, the work weight is detected for correction of the maximum acceleration $\alpha m$ in accordance therewith.

The work weight is varied, which variation is detectable as a combination of variations in drive torque and acceleration in feed direction. Therefore, by comparison between a basic data, which is obtained by moving the work table WT before the orbit boring, and a variation of drive torque during acceleration, there is calculated a variation of a total weight (with the work W inclusive) of the work table WT, whereby the weight of work W is determined in terms of mass, as follows.

Letting $\delta T$ (N·m) be a variation of torque during acceleration in a straight-linear movement of the work table WT, the variation of mass $\delta M$ (Kg) is detected, such that $\delta T = (L/2\pi)\delta M\alpha$, where L is a lead (m) of a ball screw for the feed, and $\alpha$ is acceleration in m/sec$^2$.

As the feed screw has an elongation due to inertial force that causes an elliptic error as well as a radius reduction error, there is calculated an increase in inertial force due to increase in mass, to thereby correct a value of the limitation to acceleration, which gives three corrected values, such that:

$\alpha mc = \{Mx/(Mx+\delta Mx)\}\alpha m$,     1)

$\alpha mc = \{My/(My+\delta My)\}\alpha m$, and     2)

$\alpha mc = (MxKy-MyKx)/\{(Mx+\delta Mx)Ky-(My+\delta My)Kx\}\alpha m$,     3)

where Kx and Ky are axial rigidities in X and Y directions, respectively.

In the three values, each of 1) and 2) represents an upper limit of acceleration for an error due to inertial force, and 3) represents an upper limit of acceleration for an axis elongation due to a difference between inertial forces in respective feed directions. Strictly, the value 3) receives an influence of viscosity (velocity), as well.

Among them, the smallest one is adopted as a limit value to acceleration.

For a circularity $\epsilon$ at a certain acceleration $\alpha$, there is determined an acceleration $\alpha 1$ corresponding to the circularity $\epsilon$ with the work W loaded, which also is given for the respective cases, such that:

$$\alpha \Lambda = \{Mx/(Mx+\delta Mx)\}\alpha, \qquad 1)$$

$$\alpha \Lambda = \{My/(My+\delta My)\}\alpha, \text{ and} \qquad 2)$$

$$\alpha \Lambda = (MxKy-MyKx)/\{(Mx+\delta Mx)Ky-(My+\delta My)Kx\}\alpha, \qquad 3)$$

among which the smallest one is adopted to be commensurate.

FIG. 4 is a flowchart of associated control actions.

First, at a step S10, a tolerance E is set, and at a step S11, an inertial mass is detected. Then, at a step S12, in consideration of the inertial mass, there is set an upper limit $\alpha m$ of acceleration meeting a required machining precision, which may be set calculation or by inputting the required machining precision at the user end.

It is noted that in practice the upper limit of acceleration $\alpha m$ is substituted by a value equivalent to a result of calculation therefor times a safety factor (for example, 0.8).

Next, at a step S13, on the basis of an orbit radius Ro(Z) and the upper limit $\alpha m$ of acceleration, there is calculated an maximum orbit revolution number Sm (shown as Smax for comprehension in the figure) for a current time, and at a step S14, the machining program PR is analyzed to know a revolution number S for command.

Next, at a Step S15, the revolution number S for command is compared with the maximum orbit revolution number Sm. If S<Sm, then the control flow goes to a step S16, where the revolution number S for command is set as it is to be a revolution number Sa for actual command. Unless S<Sm, the flow goes to a step S17, where the maximum orbit revolution number Sm is set as a revolution number Sa for actual command.

Then, at a step S18, $\Delta\theta$=Sa $\Delta t$ is calculated.

According to the embodiment described, by controlling an acceleration to meet a required machining precision, a machining error due to acceleration is suppressed, so that the machining error is kept constant, with a machining precision controlled within a permissible range, achieving a conforming machining precision irrespective of the setting of velocity in a machining program.

Although preferred embodiments of the present invention have been described with specific terms, the description is for illustrative purpose, and variations or modifications thereof may be made by those skilled in the art, without departing from the spirit or scope of the following claims.

What is claimed is:

1. A control method for an orbit boring to be performed by a tool in an orbital motion along an orbit, comprising:

providing a permissible range of an acceleration of the orbital motion to meet a criterion of a machining precision of the orbit boring; and controlling the acceleration to be suppressed within the permissible range.

2. A control method according to claim 1, wherein the controlling the acceleration comprises controlling a velocity of the orbital motion in proportion to a square of a radius of curvature of the orbit.

3. A control method according to claim 1, wherein the controlling the acceleration comprises controlling a set of components of a velocity of the orbital motion and a rotational speed of a spindle of the tool.

4. A control method according to claim 1, wherein the controlling the acceleration comprises clamping a component of a velocity of the orbital motion and a rotation speed of a spindle of the tool.

5. A control method according to claim 1, wherein the providing the permissible range comprises pre-reading, from a machining program of the orbit boring, data on a component of a velocity of the orbit motion and a radius of curvature of the orbit, and wherein the controlling the acceleration comprises calculating a component of the acceleration from the data, and controlling the component of the acceleration.

6. A control method according to claim 1, further comprising correcting the permissible range in dependence on a weight of a work to be machined by the tool.

7. A control method according to claim 6, wherein the correcting the permissible range comprises calculating a variation of a total weight of the work and a table of the work.

8. A controller for an orbit boring to be performed by a tool in an orbital motion along an orbit, comprising:

a provider for providing a permissible range of an acceleration of the orbital motion to meet a criterion of a machining precision of the orbit boring; and a controller for controlling the acceleration to be suppressed within the permissible range.

* * * * *